(12) United States Patent
Jornet et al.

(10) Patent No.: US 10,996,379 B2
(45) Date of Patent: May 4, 2021

(54) PLASMONIC PHASE MODULATOR AND METHOD OF MODULATING AN SPP WAVE

(71) Applicants: The Research Foundation for The State University of New York, Buffalo, NY (US); The Research Foundation of CUNY, New York, NY (US); Ngwe Thawdar, New Hartford, NY (US); Michael Medley, Durhamville, NY (US)

(72) Inventors: Josep Jornet, Clarence Center, NY (US); Prateek Kumar Singh, Troy, NY (US); Gregory Aizin, East Brunswick, NJ (US); Ngwe Thawdar, New Hartford, NY (US); Michael Medley, Durhamville, NY (US)

(73) Assignees: The Research Foundation for The State University New York, Buffalo, NY (US); The Research Foundation of CUNY, New York, NY (US)

(*) Notice: Subject to any disclaimer, the term of this patent is extended or adjusted under 35 U.S.C. 154(b) by 0 days.

(21) Appl. No.: 15/948,475

(22) Filed: Apr. 9, 2018

(65) Prior Publication Data

US 2021/0088699 A1 Mar. 25, 2021

Related U.S. Application Data

(60) Provisional application No. 62/483,080, filed on Apr. 7, 2017.

(51) Int. Cl.
*G02B 5/00* (2006.01)
*G02B 6/122* (2006.01)
*G02B 6/12* (2006.01)

(52) U.S. Cl.
CPC .......... *G02B 5/008* (2013.01); *G02B 6/1226* (2013.01); *G02B 2006/12142* (2013.01)

(58) Field of Classification Search
None
See application file for complete search history.

(56) References Cited

U.S. PATENT DOCUMENTS

| 6,782,179 B2 | 8/2004 | Bozhevolnyi et al. |
| 7,949,210 B2 | 5/2011 | Durfee et al. |
| (Continued) | | |

FOREIGN PATENT DOCUMENTS

| WO | 2004023177 A2 | 3/2004 |
| WO | 2016154764 A2 | 10/2016 |

OTHER PUBLICATIONS

Chen Py et al, Terahertz metamaterial devices based on graphene nanostructures, IEEE Transactions on Terahertz Science and Technology, Nov. 5, 2013, 3(6), p. 748-56.

(Continued)

*Primary Examiner* — Rhonda S Peace
(74) *Attorney, Agent, or Firm* — Hodgson Russ LLP (57) ABSTRACT

A plasmonic phase modulator is provided. The modulator has a conductive layer, and a dielectric layer disposed on the conductive layer. A plasmonic layer is disposed on the dielectric layer. A plasmonic layer is disposed on the dielectric layer. The plasmonic layer is conductive to surface plasmon polariton (SPP) waves. The plasmonic layer may be, for example, a graphene sheet. A voltage signal source is operatively connected between the conductive layer and the plasmonic layer for modulating a propagation speed of an SPP wave propagating on the plasmonic layer.

18 Claims, 4 Drawing Sheets

(56) References Cited

U.S. PATENT DOCUMENTS

| | | | |
|---|---|---|---|
| 8,116,600 B2* | 2/2012 | Okamoto | B82Y 20/00 |
| | | | 385/1 |
| 8,139,283 B2 | 3/2012 | Anatolyevich et al. | |
| 8,314,985 B2 | 11/2012 | Kuang | |
| 8,379,287 B2* | 2/2013 | Suh | G02F 1/035 |
| | | | 359/240 |
| 8,554,022 B1 | 10/2013 | Hochberg et al. | |
| 8,711,463 B2* | 4/2014 | Han | B82Y 20/00 |
| | | | 359/238 |
| 8,749,866 B2* | 6/2014 | Sweatlock | G02F 1/23 |
| | | | 359/245 |
| 8,780,431 B1* | 7/2014 | Kekatpure | G02B 5/008 |
| | | | 359/245 |
| 8,837,036 B2 | 9/2014 | Mazumder | |
| 8,909,002 B2* | 12/2014 | Takaoka | G02F 1/025 |
| | | | 385/1 |
| 8,983,251 B2 | 3/2015 | Lu et al. | |
| 9,134,481 B2 | 9/2015 | Avouris et al. | |
| 9,341,921 B2 | 5/2016 | Xu et al. | |
| 9,397,241 B2 | 7/2016 | Berini et al. | |
| 9,397,758 B2* | 7/2016 | Akyildiz | H04B 10/90 |
| 9,825,712 B2* | 11/2017 | Akyildiz | H04B 10/90 |
| 10,348,058 B1* | 7/2019 | Gwo | H01S 5/2031 |
| 10,663,766 B2* | 5/2020 | Ma | G02F 1/0107 |
| 2009/0136190 A1 | 5/2009 | Berini et al. | |
| 2015/0309218 A1* | 10/2015 | Shalaev | G02B 1/002 |
| | | | 359/241 |
| 2016/0227639 A1* | 8/2016 | Kaminer | H05G 2/00 |

OTHER PUBLICATIONS

Bao Y et al, Active control of graphene-based unidirectional surface plasmon launcher, Acs Photonics, Jul. 10, 2015, 2 (8), p. 1135-40.

* cited by examiner

PLASMONIC PHASE MODULATOR AND METHOD OF MODULATING AN SPP WAVE

CROSS-REFERENCE TO RELATED APPLICATIONS

This application claims priority to U.S. Provisional Application No. 62/483,080, filed on Apr. 7, 2017, the disclosure of which is incorporated herein by reference.

STATEMENT REGARDING FEDERALLY SPONSORED RESEARCH

This invention was made with government support under contract no. FA8750-15-1-0050 awarded by the Air Force Research Laboratory. The government has certain rights in the invention.

FIELD OF THE DISCLOSURE

The present disclosure relates to modulators wireless communication systems.

BACKGROUND OF THE DISCLOSURE

Wireless data rates have doubled every eighteen months for the last three decades. Following this trend, Terabit-per-second (Tbps) links are expected to become a reality within the next five years. The limited available bandwidth for communication systems in the microwave frequency range motivates the exploration of higher frequency bands for communication. In this direction, millimeter wave (mm-wave) communication systems, such as those at 60 GHz, have been heavily explored in the last decade. However, despite their much higher operation frequency, the available bandwidth for communication is less than 10 GHz. This would require the use of communication schemes able to provide a spectral efficiency in the order of 100 bits/second/Hz to support 1 Tbps, which is several times above the state-of-the-art for wireless communication.

In this context, the Terahertz band (0.1-10 THz) is envisioned as a key player to satisfy the need for much higher wireless data rates. Despite the absorption from water vapor molecules, the THz band supports very large transmission bandwidths, which range from almost 10 THz for communication distances below one meter, to multiple transmission windows, each of them tens to hundreds of GHz wide, for distances in the order of tens of meters. Traditionally, the lack of compact and efficient THz signal sources and detectors, able to operate at room temperature, has limited the use of the THz band. However, major progress in the last decade is finally helping to close the THz gap.

In addition to THz signal sources and detectors, a modulator is needed to embed information on the transmitted signals. The desired properties of a modulator include high modulation bandwidth, i.e., the speed at which the properties of the modulated signal can be changed, and high modulation depth, i.e., the maximum difference between modulation states. Different types of modulators able to control the amplitude or phase of THz waves have been developed to date. A high-electron-mobility transistor based on a III-V semiconductor material was utilized to modulate the amplitude of a THz wave. In another work, a metamaterial-based modulator was utilized to control the phase of a THz wave. In both cases, sub-GHz modulation bandwidths and low modulation depths limited the use of these devices in practical communication systems.

More recently, the use of graphene to develop THz wave modulators has been proposed. Graphene has excellent electrical conductivity, making it very well suited for propagating extremely-high-frequency electrical signals. A graphene-based amplitude modulator for THz waves was developed. This was enabled by the possibility to dynamically control the conductivity of graphene. In another work, a similar principle was exploited in a graphene-based meta-device. In these setups, the main challenge was to increase the modulation depth. A low modulation depth makes the transmitted symbols more difficult to distinguish and, thus, results in higher symbol error rates (SER) in practical communication systems.

BRIEF SUMMARY OF THE DISCLOSURE

In a first aspect, the present disclosure provides a plasmonic phase modulator having a conductive layer. A dielectric layer is disposed on the conductive layer. The dielectric layer may be made from silicon dioxide ($SiO_2$). A plasmonic layer is disposed on the dielectric layer, the plasmonic layer being conductive to surface plasmon polariton (SPP) waves. The plasmonic layer may be, for example, a graphene sheet. The plasmonic layer has a length along a direction of wave travel. A voltage signal source is operatively connected between the conductive layer and the plasmonic layer for modulating a propagation speed of an SPP wave propagating on the plasmonic layer.

In some embodiments, the plasmonic phase modulator may further include an SPP generator operatively coupled to a first end of the plasmonic layer. In some embodiments, the plasmonic phase modulator may further include an antenna operatively coupled to a second end of the plasmonic layer.

In another aspect, the present disclosure may be embodied as a method for modulating an SPP wave. The method includes launching an SPP wave on a plasmonic layer of a plasmonic wave guide. The plasmonic layer of the plasmonic waveguide may be a graphene sheet. A bias voltage is applied to a region of the plasmonic layer to control the Fermi energy of the plasmonic layer at the region. The bias voltage is modulated to impart a corresponding phase modulation to the SPP wave. The method may further include radiating the SPP wave using an antenna.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

A graphene-based plasmonic phase modulator for THz-band communications is provided, and the performance is modeled and analyzed herein. In some embodiments, the presently-disclosed modulator comprises a fixed-length graphene-based plasmonic waveguide with a metallic back gate. Not intending to be bound by any particular theory, its working principle is based on the ability to control the propagation speed of a Surface Plasmon Polariton (SPP) wave on graphene at THz frequencies by modifying the chemical potential of the graphene layer. An analytical model is developed herein starting from the dynamic complex conductivity of graphene and a revised dispersion equation for SPP waves. By utilizing the model, the performance of the presently-disclosed plasmonic modulator is analyzed when utilized to implement an M-ary phase shift keying modulation in terms of SER. The model is validated using electromagnetic simulations, and numerical results are provided to illustrate the modulator performance. The results show that, despite generating a non-uniform signal space constellation, the modulated symbols are sufficiently apart to be easily distinguishable. This highlights the use of the presently-disclosed approach for practical wireless communication systems in the THz band.

Figure 1:
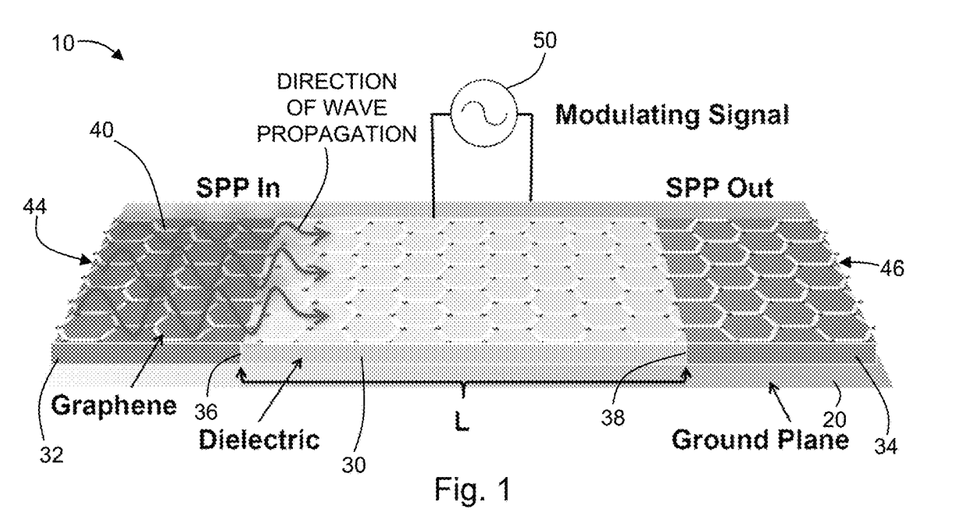
FIG. 1 is a diagram of a phase modulator according to an embodiment of the present disclosure.

With reference to FIG. 1, a plasmonic phase modulator 10 is provided. The phase modulator 10 has a conductive layer 20, for example, a ground plane, such as a metallic ground plane. The conductive layer 20 may be made from any material conductive for the subject frequencies including, for example, metals, highly-doped semiconductor materials, etc. A dielectric layer 30 of length L is disposed on the conductive layer 20. Dielectric material may extend on the ground plane 20 beyond the length of the dielectric layer 30, however, a separation such as, for example, a gap 36,38, may be provided between the dielectric layer 30 and the remainder of the dielectric material to define the bounds of the dielectric layer 30 of the phase modulator 10. For example, in the modulator 10 depicted in FIG. 1, a first dielectric material 32 (i.e., adjacent dielectric material) is separated from the dielectric layer 30 by gap 36, and a second dielectric material 34 (i.e., adjacent dielectric material) is separated from the dielectric layer 30 by gap 38. The dielectric layer 30 may be made from, for example, $SiO_2$, a thermal oxide, a high-k dielectric, etc. Other materials which function as suitable dielectrics and will be apparent to one of skill in the art in light of the present disclosure, including the analytical discussion below.

A plasmonic layer 40 is disposed on the dielectric layer 30. The plasmonic layer 40 is made from a material conductive to plasmons. For example, in some embodiments, the plasmonic layer 40 comprises a graphene sheet, such as, for example, a graphene nanoribbon. The plasmonic layer 40 has a length along a direction of wave propagation. The direction of wave propagation may extend from a first end 44 of the plasmonic layer 40 to a second end 46 of the plasmonic layer 40. A voltage signal source 50 may be operatively connected between the conductive layer 20 and the plasmonic layer 40 for modulating a propagation speed of a surface plasmon polariton (SPP) wave propagating on the plasmonic material of the plasmonic layer 40, as further described in the analytical discussion below. The signal source 50 is coupled to the plasmonic layer 50 such that the voltage signal is applied to the plasmonic layer 40 at a location along its length which is within the region defined by the extent of the dielectric layer 30. In this way, a bias voltage can be applied to the plasmonic layer 40.

Figure 5:
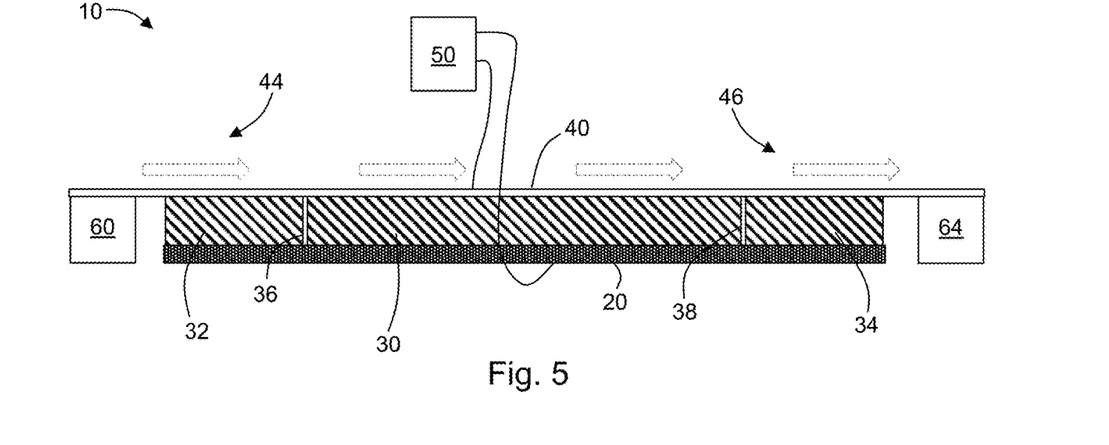
FIG. 5 is a side elevation view diagram of a modulator according to another embodiment of the present disclosure.

With further reference to FIG. 5, an SPP generator 60 may be operatively connected at the first end 44 of the plasmonic layer 40 and configured to selectively launch an SPP wave. The SPP generator 60 may be, for example, a high-electron-mobility transistor (HEMT)-like device coupled to the first end 44 of the plasmonic layer 40. In another example, the SPP generator may be a Quantum Cascade Laser and a grating structure. In some embodiments, the plasmonic layer 40 may extend to and/or be a part of a plasmonic layer of the SPP generator 60. In this way, an SPP wave launched onto the plasmonic layer of the SPP generator may continue through the phase modulator 10 by way of the common plasmonic layers.

The phase modulator 10 may further comprise an antenna 64, for example, a plasmonic nano-antenna, for radiating the SPP wave. The antenna 64 may be located at the second end 46 of the plasmonic layer 40 so as to radiate the phase-modulated wave after having passed through an active region proximate to the dielectric region. In some embodiments, the plasmonic layer 40 may extend to and/or be a part of a plasmonic layer of the antenna 60. In this way, an SPP wave may continue from the plasmonic layer of the phase modulator 10 to the antenna 64 by way of common plasmonic layers.

Figure 6:
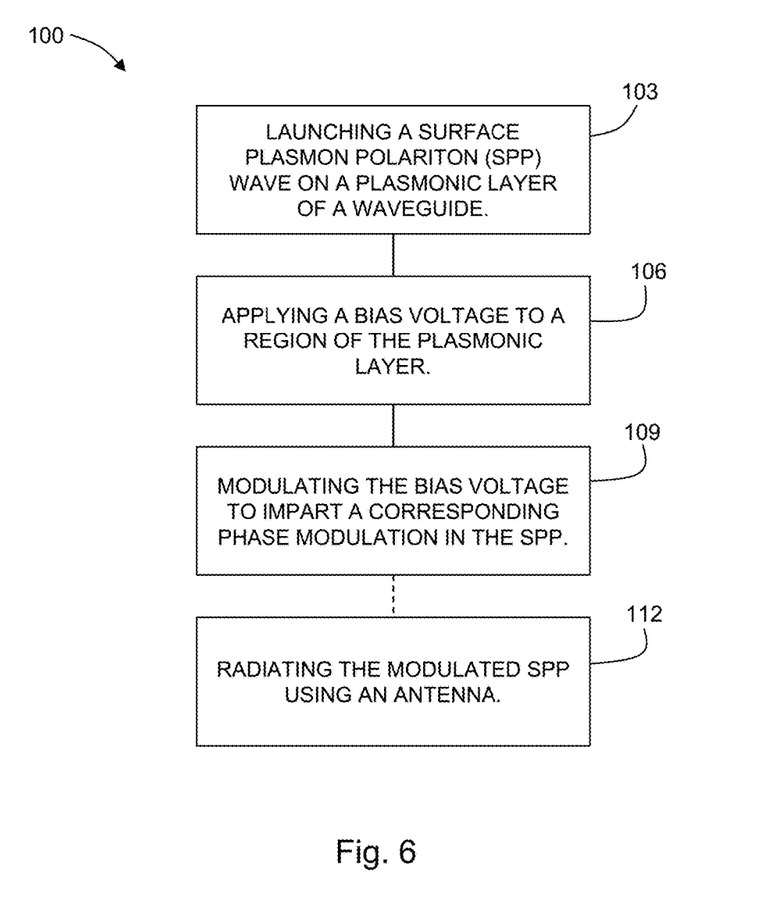
FIG. 6 is a chart showing a method according to another embodiment of the present disclosure.

With respect to FIG. 6, in another aspect, the present disclosure may be embodied as a method 100 for modulating an SPP wave. The method 100 includes launching 103 an SPP wave on a plasmonic layer of a plasmonic waveguide. The plasmonic waveguide may be configured as described above with a plasmonic layer, such as, for example, graphene, disposed on a dielectric layer and a conductive layer. A bias voltage is applied 106 to a region of the plasmonic layer to control the Fermi energy of the plasmonic layer at the region. By controlling the Fermi energy, $E_F$, the propagation speed of the SPP wave may be controlled is a corresponding manner. In this way, the phase of the SPP wave may be controlled. The bias voltage is modulated 109 to impart a corresponding phase modulation to the SPP wave. The method 100 may also include radiating 112 the SPP wave using an antenna.

Embodiments of the present disclosure are further described below with reference to graphene structures. It should be noted that examples and embodiments used are illustrative and not intending to be limiting.

Propagation Properties of Surface Plasmon Polariton Waves on Gated Graphene Structures The characterization of SPP propagation properties on graphene is used for the analysis of the presently-disclosed plasmonic phase modulator. These properties depend on the conductivity of the graphene sheet. In this section, the conductivity model utilized in the analysis is reviewed and the dispersion equation for SPP waves on gated graphene structures is defined.

A. Complex Conductivity Model of Graphene

For the analysis, consider a surface conductivity model for infinitely large graphene sheets obtained using the Kubo formalism. This is given by $$\sigma^g = \sigma^g_{intra} + \sigma^g_{inter}, \quad (1)$$

$$\sigma^g_{intra} = i\frac{2e^2}{\pi\hbar^2}\frac{k_B T}{\omega + i\tau_g^{-1}}\ln\left(2\cosh\left(\frac{E_F}{2k_B T}\right)\right), \quad (2)$$

$$\sigma^g_{inter} = \frac{e^2}{4\hbar}\left(H\left(\frac{\omega}{2}\right) + i\frac{4\omega}{\pi}\int_0^\infty \frac{G(\epsilon) - G(\omega/2)}{\omega^2 - 4\epsilon^2}d\epsilon\right), \text{ and} \quad (3)$$

$$G(a) = \frac{\sinh\left(\frac{\hbar a}{k_B T}\right)}{\cosh\left(\frac{E_F}{k_B T}\right) + \cosh\left(\frac{\hbar a}{k_B T}\right)}, \quad (4)$$

where $\omega=2\pi f$, $\hbar=h/2\pi$ is the reduced Planck's constant, e is the electron charge, $k_B$ is the Boltzmann constant, T is temperature, $E_F$ refers to the Fermi energy of the graphene sheet, and $\tau_g$ is the relaxation time of electrons in graphene, which depends on the electron mobility $\mu_g$. $E_F$ can be modified by means of electrostatic bias or gating of the graphene layer, enabling the aforementioned antenna tuning.

A more accurate conductivity model can be developed by taking into account the impact of electron lateral confinement on graphene nano-ribbons, but the two models converge for graphene strips which are 50 nm wide or more. In the present analysis, plasmonic resonant cavities which are a few hundred nanometers wide are considered. Finally, it is noted that the conductivity model described by (1) and the following was derived by neglecting the spatial dispersion of the AC field. Therefore, it can be used for the analysis of the SPP propagation in the long wavelength limit only, i.e., $\omega \gg k_{spp}v_F$, where $k_{spp}$ is the SPP wave number and $v_F \approx 8 \times 10^5$ m/s is the Fermi velocity of Dirac fermions in graphene.

B. Dispersion Equation for Surface Plasmon Polariton Waves

The propagation properties of SPP waves can be obtained by deriving and solving the SPP wave dispersion equation on graphene. In related graphene plasmonic work, the dispersion equation was obtained by considering a graphene layer at the interface between two infinitely large dielectric materials, usually between air and silicon dioxide ($SiO_2$). However, the presently-disclosed modulator utilizes the presence of a metallic ground plane at a distance d from the graphene layer, which is used both to create the plasmonic waveguide as well as to control the Fermi energy of the graphene layer and tune its conductivity.

The dispersion equation for Transverse Magnetic (TM) SPP waves on gated graphene structures in the quasi-static regime—i.e., for $k_{spp} \gg \omega/c$, where c is the speed of light—is given by $$-i\frac{\sigma^g}{\omega\epsilon_0} = \frac{\epsilon_1 + \epsilon_2 \coth(k_{spp}d)}{k_{spp}}, \quad (5)$$

where $\sigma^g$ is the conductivity of graphene given by (1), $\epsilon_1$ is the relative permittivity of the dielectric above the graphene layer, and $\epsilon_2$ is the relative permittivity of the dielectric between the graphene layer and the metallic ground plane, which are separated by a distance d. It can be easily shown by taking the limit of $d \to \infty$ that (5) tends to the quasi-static dispersion equation of SPP waves in ungated graphene used in the aforementioned works.

By solving (5), the complex wave vector $k_{spp}$ can be obtained. The real part of the wave vector, $$\text{Re}\{k_{spp}\} = \frac{2\pi}{\lambda_{spp}} = \frac{\omega}{v_p}, \quad (6)$$

determines the SPP wavelength $\lambda_{spp}$ and the SPP wave propagation speed. The imaginary part determines the SPP decay or, inversely, $$\mathcal{L} = \frac{1}{2\text{Im}\{k_{spp}\}}, \quad (7)$$

determines the SPP propagation length, which is defined as the distance at which the SPP intensity has decreased by a value of 1/e. A closed-form expression for $k_{spp}$ in this case can be obtained numerically.

Graphene-Based Plasmonic Phase Modulator

In this section, the working principle of the plasmonic phase modulator is explained and its analytical model is developed.

A. Working Principle

The conceptual design of the presently-disclosed graphene-based plasmonic phase modulator is shown in FIG. 1. The phase modulator comprises a plasmonic waveguide, which comprises a graphene sheet (the plasmonic material) mounted over a metallic flat surface (the ground plane), with a dielectric material layer in between, which supports the graphene layer. For convenience, it is considered herein that an SPP wave is already propagating over the graphene layer. Different mechanisms could be utilized to launch the SPP wave. For example, a THz plasma wave could be generated by a high-electron-mobility transistor (HEMT)-like device and coupled to the graphene waveguide. Alternatively, a Quantum Cascade Laser and a grating structure could be utilized for the same. The basic idea for any phase modulator is to establish a relation between the data bits to be transmitted, which constitute the modulating signal, and the transmitted signal phase. In the presently-disclosed plasmonic phase modulator, the modulating signal is applied as a bias voltage to the graphene layer and control its Fermi energy, $E_F$. From (6), (5), and (1), it is clear that the Fermi energy directly controls the propagation speed of the SPP wave on the gated graphene structure. Therefore, for a fixed-length waveguide, the phase at the output of the waveguide is effectively modulated by the data bits to be transmitted. The resulting signal can be further propagated and eventually radiated in free-space by means of a plasmonic nano-antenna.

B. Analytical Model

The plasmonic signals at the input and the output of the plasmonic waveguide are denoted as X and Y, respectively. The modulator frequency response is denoted by H. The following relation can be then written, $$Y(f,E_F) = X(f)H(f,E_F), \quad (8)$$

where f stands for frequency and $E_F$ is the Fermi energy of the graphene layer on which the SPP wave propagates.

The modulator frequency response H is given by $$H(f,E_F) = |H(f,E_F)|\exp(j\theta(f,E_F)), \quad (9)$$

where |H| accounts for the variation in the SPP wave intensity and θ represents the change in the SPP phase at the output of the fixed-length waveguide.

From above, the magnitude of the modulator response can be written as $$|H(f,E_F)|=\exp(-2\text{Im}\{k_{spp}(f,E_F)\}L), \quad (10)$$

where L represents the waveguide length.

The total phase change θ that the SPP wave suffers as it propagates through the waveguide is given by $$\theta(f, E_F) = \frac{2\pi L}{\lambda_{spp}(f, E_F)} = L\text{Re}\{k_{spp}(f, E_F)\}, \quad (11)$$

where $\lambda_{spp}$ is the plasmonic wavelength obtained from $k_{spp}$ as discussed above, which depends on the signal frequency f and the Fermi energy $E_F$.

By combining (10) and (11) in (9), the modulator frequency response can be written as $$H(f,E_F)=\exp(-2\text{ Im}\{k_{spp}(f,E_F)\}L)\cdot\exp(j\text{ Re}\{k_{spp}(f,E_F)\}L). \quad (12)$$

In an ideal phase modulator, the intensity or amplitude of the signal should remain constant, independently of the phase. However, the SPP decay in graphene structures is not negligible. As a result, the signal amplitude and phase cannot be independently modulated. This has a direct impact on the performance of the modulator in a practical communication system, which is analyzed below.

Performance Analysis

In this section, the constellation of a non-uniform plasmonic phase shift keying digital modulation is defined and the SER for M-ary modulations is formulated.

A. Signal Space Constellation

The signal space or constellation represents the possible symbols generated by a given modulation scheme as points in the complex plane. The real part of each of such points is referred to as the in-phase component and the imaginary part denotes the quadrature component.

The number of modulated symbols or points in the constellation is given by $M=2^k$, where k=2, 4, ... refers to the modulation order. The position of each symbol $S_m$, m=M, depends on the modulator behavior. For the system above, at fixed carrier frequency $f_c$, the magnitude and phase of each symbol is given by $$S_m=|S_m|\exp(\theta_m), \quad (13)$$

$$|S_m|=A_0|H(f_c,E_{F,m})|, \quad (14)$$

$$\theta_m=\theta_0+\theta(f_c,E_{F,m}), \quad (15)$$

where $A_0$ and $\theta_0$ refer to the amplitude and phase of the input SPP wave. $E_{F,m}=\{E_{F,1}, E_{F,1}, \ldots E_{F,M}\}$ is the set of Fermi energies that correspond to the transmitted symbols. The present analysis considers $A_0=1$ and $\theta_0=0$. The constellation for the presently-disclosed plasmonic phase modulator is numerically obtained below under the heading "Simulation and Numerical Results."

B. Symbol Error Rate

The most common metric for a modulation scheme in a practical communication system is the SER. This is implicitly related to the modulation intensity or depth. The more "distinguishable" the symbols are, the lower the SER. In general terms, for a modulated symbol $S_m$, the symbol error probability $P_e$ is given by $$P_e=P\{\text{Detect } S_{\tilde{m},\tilde{m}\neq m|\text{Given that } S_m} \text{ is sent}\}, \quad (16)$$

where m=1, 2, 3 ... M. The SER for a digital phase modulation with uniform constellation is derived based on the symbol decision regions, which due to symmetry, are easy to define. However, this is not the case for non-uniform modulations.

Instead, the SER for the presently-disclosed plasmonic phase modulation scheme can be directly derived starting from the distance between symbols in the non-uniform constellation.

In general terms, the union bound for the SER is given by $$SER \leq \frac{1}{M}\sum_{m=1}^{M}\sum_{1\leq \tilde{m}\leq M, \tilde{m}\neq m} Q\left[\sqrt{\frac{D(S_m, S_{\tilde{m}})^2}{2N_0}}\right], \quad (17)$$

where the Q function refers to the tail probability of the standard normal distribution, $D(S_m, S_{\tilde{m}})$ stands for the distance between two symbols $S_m$ and $S_{\tilde{m}}$, and is given by $$D(S_m,S_{\tilde{m}})^2=\|S_m-S_{\tilde{m}}\|^2, \quad (18)$$

and $N_0$ is the noise power spectral density.

A common representation of the SER is as a function of signal-to-noise ratio (SNR) or the energy per symbol to noise power spectral density $E_s/N_0$. From (14), this is given by $$SNR_m = \frac{E_{s,m}}{N_0} = \frac{|H_m(f_c, E_F)|^2}{N_0}. \quad (19)$$

Finally, by combining (17), (18) and (19), the SER for the non-uniform constellation can be further expressed as $$SER \leq \frac{1}{M}\sum_{m=1}^{M}\sum_{1\leq \tilde{m}\leq M, \tilde{m}\neq m} Q\left[\left(\frac{E_{s,m}e^{j2\theta_m}}{N_0} + \frac{E_{s,\tilde{m}}e^{j2\theta_{\tilde{m}}}}{N_0} - 2\cos(\theta_m+\theta_{\tilde{m}})\sqrt{\frac{E_{s,m}}{N_0}\frac{E_{s,\tilde{m}}}{N_0}}\right)^{\frac{1}{2}}\right]. \quad (20)$$

The SER will be numerically investigated in the next section.

Simulation and Numerical Results

In this section, the models are validated and the performance of the presently-disclosed plasmonic phase modulator is analyzed.

A. Model Validation

Figure 2A:
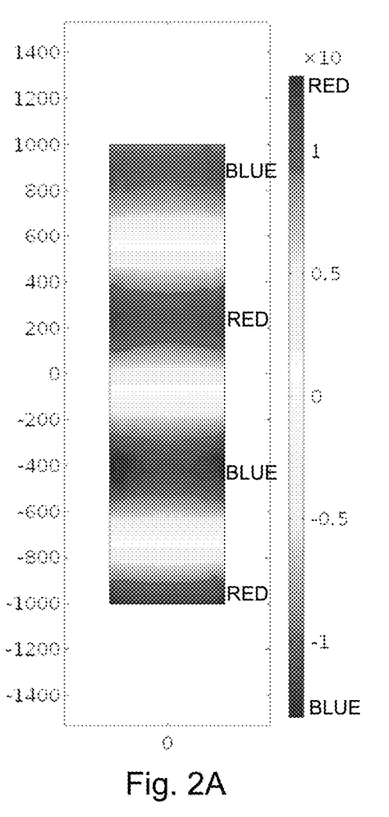
FIG. 2A shows the electric field distribution over a graphene-based waveguide at $f_c$=4 THz, for Fermi energy $E_F$=0.13 eV (L=2 μm, d=90 nm)
Figure 2B:
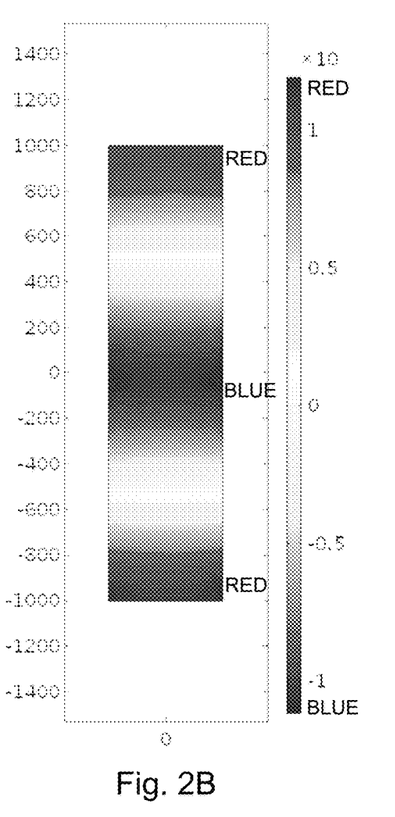
FIG. 2B shows the electric field distribution over a graphene-based waveguide at $f_c$=4 THz, for Fermi energy $E_F$=0.28 eV (L=2 μm, d=90 nm). $E_F$=0.28 eV.

COMSOL Multiphysics was used to simulate the behavior of the plasmonic phase modulator shown in FIG. 1. Graphene is modeled as a transition boundary condition with impedance given by (1), with $\tau_g$=2.2 ps at room temperature T=300 K. The graphene layer rests on top of a metallic ground plane with a 90 nm-thick Sift dielectric in between ($\varepsilon_r$=4). In FIGS. 2A and 2B, the z-component of the electric field on a 2-μm-long graphene-based waveguide is shown for $f_c$=4 THz and two values of $E_F$, namely, 0.13 eV and 0.28 eV. For $E_F$=0.13 eV, the waveguide length L corresponds to approximately one and a half SPP wavelength and, thus, it introduces a phase change of π. For $E_F$=0.28 eV, the waveguide length L corresponds to one full SPP wavelength and introduces a phase change of 2π. Hence, a plasmonic phase modulator of order M=2 can be defined, where bit "0"

is transmitted as a phase change of $2\pi$ by tuning $E_F$ to 0.28 eV and bit "1" is transmitted with a phase change of $\pi$ by tuning $E_F$ to 0.13 eV.

Figure 3A:
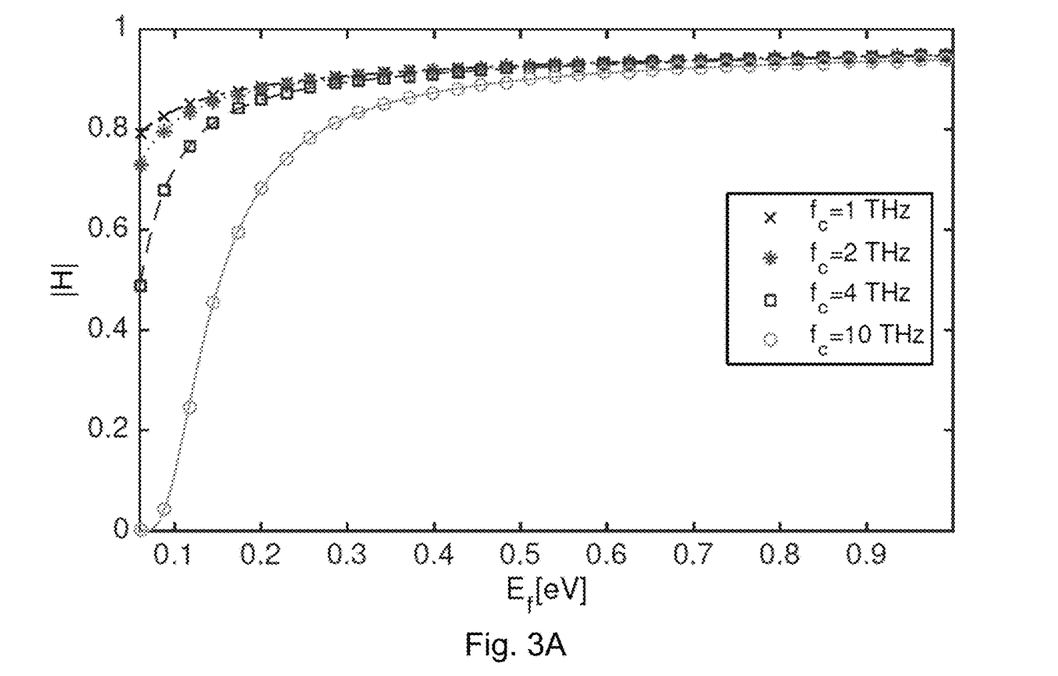
FIG. 3A shows the magnitude ($|H(f_c, E_F)|$) of a phase modulator of the present disclosure, as a function of the Fermi energy, $E_F$, for different carrier frequencies $f_c$ (L=2 μm, d=90 nm)
Figure 3B:
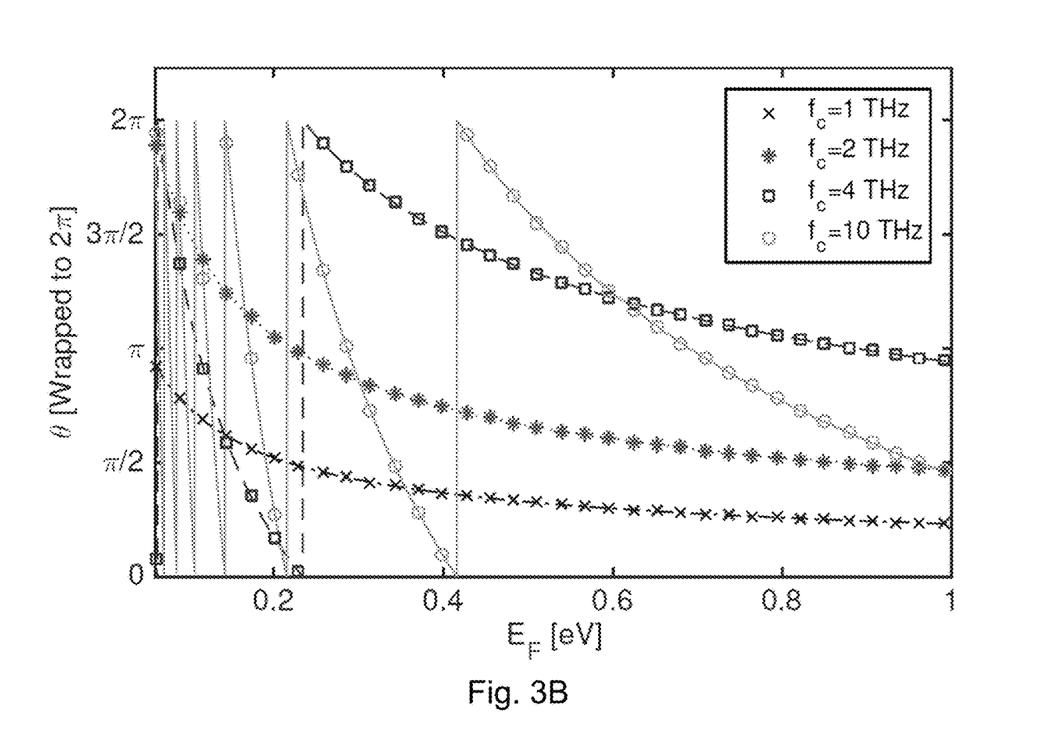
FIG. 3B shows the phase ($\theta(f_c, E_F)$) of the phase modulator of FIG. 3A, as a function of the Fermi energy, $E_F$, for different carrier frequencies $f_c$ (L=2 μm, d=90 nm)

In addition to the phase, the change in the amplitude of the SPP wave amplitude is considered, as it will affect the signal space constellation and the SER. FIGS. 3A and 3B illustrate the magnitude and phase of the plasmonic phase modulator as a function of the Fermi energy, $E_F$, and for different carrier frequencies, $f_c$. On the one hand, it is desirable to work in a range of $E_F$ such that the magnitude of the modulator does not significantly change. On the other hand, however, a phase difference of at least $\pi$ is needed to create orthogonal symbols. Next, the performance of a specific modulator design is investigated.

B. Constellation and Symbol Error Rate

Figure 4A:
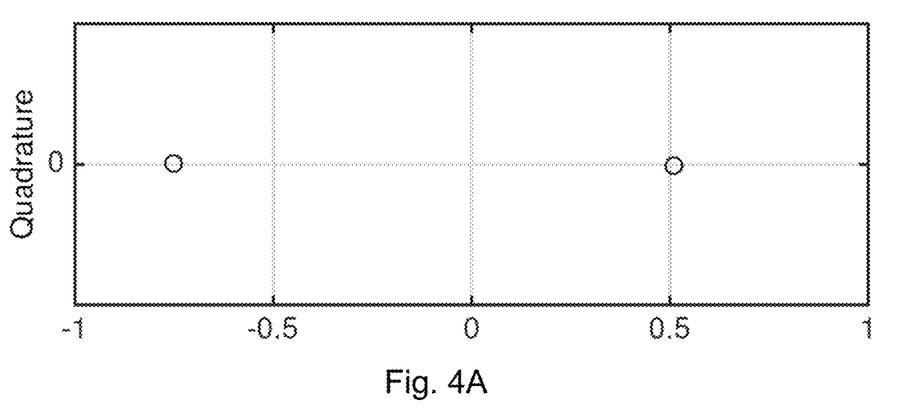
FIG. 4A shows the constellation of a binary plasmonic phase modulator with $E_{F,0}=0.28$ eV, $E_{F,1}=0.13$ eV, ($f_c=4$ THz, L=2 μm, d=90 nm)
Figure 4B:
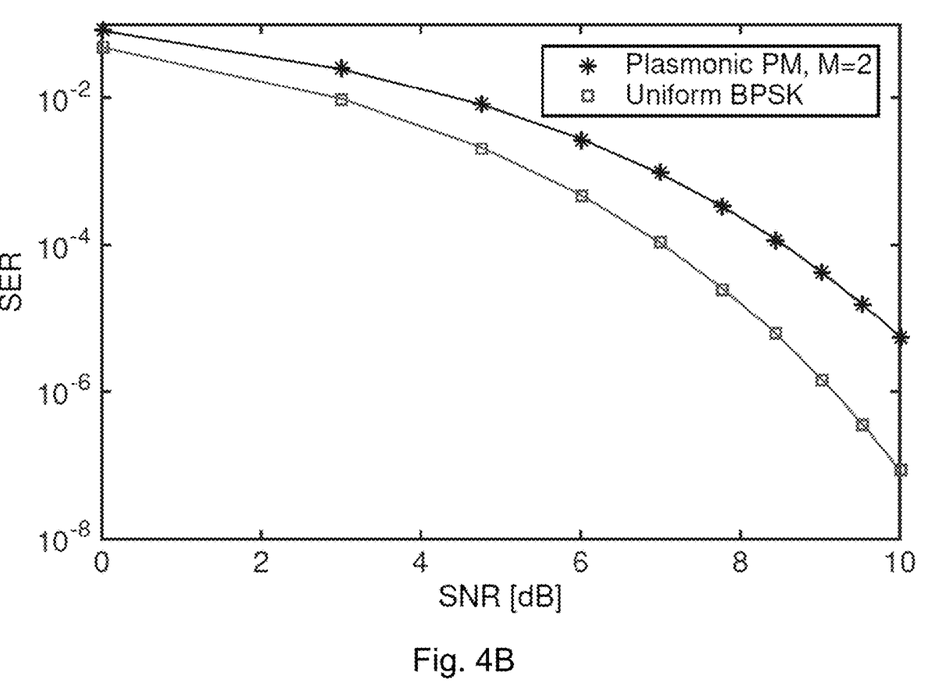
FIG. 4B shows the symbol error rate (SER) of the binary plasmonic phase modulator of FIG. 4A.

In FIG. 4A, the non-uniform constellation for a plasmonic phase modulator with $f_c$=4 THz, $E_{F,0}$=0.28 eV, $E_{F,1}$=0.13 eV, and L=2 μm, d=90 nm is shown. Similarly, in FIG. 4B, the SER (17) for the presently-disclosed modulator is shown as a function of the SNR and compared to that of a uniform binary phase shift keying (BPSK) modulation with the same average energy per symbol $E_s$. As expected, the SER for the presently-disclosed modulator is slightly higher but still comparable to that of the uniform case.

Although the present disclosure has been described with respect to one or more particular embodiments, it will be understood that other embodiments of the present disclosure may be made without departing from the spirit and scope of the present disclosure.

We claim:

1. A plasmonic phase modulator, comprising:
   a conductive layer;
   a dielectric layer disposed on the conductive layer, the dielectric layer having a length along a direction of wave propagation;
   a plasmonic layer disposed on the dielectric layer, wherein the plasmonic layer comprises a graphene sheet; and
   a voltage signal source electrically connected between the conductive layer and the plasmonic layer for modulating a propagation speed of a surface plasmon polariton (SPP) wave propagating on the plasmonic layer.

2. The plasmonic phase modulator of claim 1, wherein the dielectric layer is made from silicon dioxide ($SiO_2$).

3. The plasmonic phase modulator of claim 1, wherein a length of the plasmonic layer is greater than the length of the dielectric layer.

4. The plasmonic phase modulator of claim 1, further comprising an SPP generator operatively coupled to a first end of the plasmonic layer.

5. The plasmonic phase modulator of claim 4, further comprising an antenna for radiating an SPP wave, the antenna operatively coupled to a second end of the plasmonic layer which is opposite of the first end.

6. The plasmonic phase modulator of claim 1, wherein the conductive layer is a ground plane.

7. The plasmonic phase modulator of claim 1, having adjacent dielectric material disposed on the conductive layer and spaced apart from the dielectric layer in the direction of wave propagation.

8. A method for modulating an SPP wave, comprising:
   launching an SPP wave on a plasmonic layer of a plasmonic wave guide;
   applying a bias voltage to a region of the plasmonic layer using a voltage signal source electrically connected to the plasmonic layer to control the Fermi energy of the plasmonic layer at the region; and
   modulating the bias voltage to impart a corresponding phase modulation to the SPP wave.

9. The method of claim 8, further comprising radiating the SPP wave using an antenna.

10. The method of claim 8, wherein the plasmonic layer comprises a graphene sheet.

11. A plasmonic phase modulator, comprising:
    a conductive layer;
    a dielectric layer disposed on the conductive layer, the dielectric layer having a length along a direction of wave propagation;
    a plasmonic layer disposed on the dielectric layer;
    a voltage signal source operatively connected between the conductive layer and the plasmonic layer for modulating a propagation speed of a surface plasmon polariton (SPP) wave propagating on the plasmonic layer; and
    adjacent dielectric material disposed on the conductive layer and spaced apart from the dielectric layer in the direction of wave propagation.

12. The plasmonic phase modulator of claim 11, wherein the plasmonic layer comprises a graphene sheet.

13. The plasmonic phase modulator of claim 11, wherein the dielectric layer is made from silicon dioxide ($SiO_2$).

14. The plasmonic phase modulator of claim 11, wherein a length of the plasmonic layer is greater than the length of the dielectric layer.

15. The plasmonic phase modulator of claim 11, further comprising an SPP generator operatively coupled to a first end of the plasmonic layer.

16. The plasmonic phase modulator of claim 15, further comprising an antenna for radiating an SPP wave, the antenna operatively coupled to a second end of the plasmonic layer which is opposite of the first end.

17. The plasmonic phase modulator of claim 11, wherein the conductive layer is a ground plane.

18. The plasmonic phase modulator of claim 11, having adjacent dielectric material disposed on the conductive layer and spaced apart from the dielectric layer in the direction of wave propagation.

* * * * *